United States Patent [19]
Tsuzuku et al.

[11] Patent Number: 6,148,794
[45] Date of Patent: Nov. 21, 2000

[54] INDUCTION CONTROL SYSTEM FOR MULTI-VALVE ENGINE

[75] Inventors: Hiroyuki Tsuzuku; Naoki Tsuchida; Takeshi Ito, all of Iwata, Japan

[73] Assignee: Yamaha Hatsudoki Kabushiki Kaisha, Iwata, Japan

[21] Appl. No.: 08/932,117

[22] Filed: Sep. 17, 1997

Related U.S. Application Data

[62] Division of application No. 08/602,077, Feb. 15, 1996, Pat. No. 5,852,994.

[30] Foreign Application Priority Data

Feb. 15, 1995 [JP] Japan ................................ 7-051739

[51] Int. Cl.[7] ................................................... F02M 1/00
[52] U.S. Cl. ........................................... 123/423; 123/308
[58] Field of Search .................................. 123/308, 432, 123/568, 571

[56] References Cited

U.S. PATENT DOCUMENTS

| | | | |
|---|---|---|---|
| 4,856,473 | 8/1989 | Kawai et al. ........................ | 123/308 |
| 5,203,299 | 4/1993 | Ueda ................................... | 123/308 |
| 5,329,912 | 7/1994 | Matsumoto et al. ................ | 123/568 |
| 5,487,365 | 1/1996 | Isaka ................................... | 123/308 |
| 5,549,088 | 8/1996 | Isaka ................................... | 123/308 |
| 5,551,394 | 9/1996 | Yoshikawa .......................... | 123/432 |
| 5,720,259 | 2/1998 | Sakurai et al. ..................... | 123/432 |
| 5,765,531 | 6/1998 | Yoshikawa et al. ................ | 123/432 |
| 5,799,638 | 9/1998 | Tsuchida et al. ................... | 123/432 |
| 5,852,994 | 12/1998 | Tsuzuku et al. ................... | 123/308 |

*Primary Examiner*—John Kwon
*Attorney, Agent, or Firm*—Knobbe, Martens, Olson & Bear LLP

[57] ABSTRACT

A number of embodiments of induction systems for multiple valve internal combustion engines wherein the performance of the engine is improved throughout the engine speed and load ranges by providing variable effective areas for the induction passages. The embodiments disclosed all relate to three intake valve engines and show a number of different variations in intake passages. In all embodiments an EGR system is employed for improving exhaust emission control.

9 Claims, 8 Drawing Sheets

INDUCTION CONTROL SYSTEM FOR MULTI-VALVE ENGINE

This application is a divisional of U.S. patent application Ser. No. 08/602,077, filed Feb. 15, 1996, now U.S. Pat. No. 5,852,994.

BACKGROUND OF THE INVENTION

This invention relates to an internal combustion engine and more particularly to an improved induction system for such engines and particularly those having multiple intake valves.

It has been acknowledged that the performance of an internal combustion engine can be substantially improved by providing multiple intake valves. By employing a larger number of smaller valves having the same effective flow area, the breathing capacity of an engine can be improved and the performance improved. This is primarily due to the better distribution of the flow area and also the lower inertia of the valve components. Single large valves are quite heavy and require large return springs that add to the mechanical losses in the engine.

One disadvantage with the increased induction capability, however, is that the engine performance tends to deteriorate at lower speeds and lower loads. The reason for this has been found to be that the air velocity in the combustion chamber is quite low at low speeds and this results in reduced combustion rates due to the slow flame propagation. As a result, in conventional multi-valve engines, the engine tends to run inefficiently at low speeds.

There have been proposed, therefore, induction systems wherein the effective flow area of the intake passage is varied so as to provide high breathing capabilities at high speeds and high loads. However, the area of the induction passage is effectively reduced at low speeds and low loads so as to maintain higher flow velocities and improved turbulence in the combustion chamber.

In addition to the desirability of maintaining good combustion conditions and high power outputs, there is also the question of emission control. At times, engines which have efficient intake passages may produce high amounts of unwanted exhaust gas constituents and, particularly, $NO_x$. It has been proposed to limit or reduce the amount of $NO_x$ emissions by lowering the combustion temperature. One way in which this can be done is by introducing exhaust gases into the intake system. This practice called "EGR" is utilized in many engines.

However, the tolerance of the engine to exhaust gas recirculation is limited. That is, with most engines there is a practical limit as to the amount of exhaust gases which can be recirculated. If this limit is exceeded, then very rough running engine performance results.

It is, therefore, a principal object of this invention to provide an improved engine induction system which permits performance gains throughout the entire power band and which also permits the use of high amounts of exhaust gas recirculation for emission control.

It is a further object of this invention to provide an improved induction system for an engine wherein high amounts of exhaust gas recirculation can be obtained without reducing engine performance or introducing rough running.

It should be obvious from the foregoing description that multi-valve engines having the form of induction control that varies the effective are of the intake passages can become quite complicated. This presents problems, particularly with automotive applications because of the limited available space.

It is, therefore, a still further object of this invention to provide an improved induction system for an engine which provides adequate and the desired air flows under all running conditions and wherein the induction system is nevertheless compact and efficient.

One of the ways in which a multi-valve engine can be configured so as to provide a smaller effective flow area at lower speeds is through the use of throttle valves in one or more of the intake passages. By throttling the flow through certain of the intake passages, the flow velocity through the remaining intake passages can be increased. It also has been the practice to provide a control valve for the engine intake passage wherein the control valve, in addition to restricting the flow, can redirect the flow.

It has been found that tumble, a type of swirling motion that occurs about a transverse axis to the cylinder bore axis, can significantly improve engine running under certain load conditions. One of the advantages of tumble is that the tumble action continues to increase as the piston approaches it top dead center position. More conventional swirl around the cylinder bore axis may tend to diminish as the piston reaches top dead center condition. The time when the turbulence is desirable to improve combustion is at the time of firing of the spark plug which is close to top dead center position. Therefore, tumble has some advantages over swirl.

Tumble, on the other hand, is more difficult to generate in the combustion chamber. This is particularly true when multiple valves are employed. Particularly, when three intake valves are utilized per cylinder, then the flow from the center intake valve tends to create a tumble motion in an opposition to that of the side intake valves.

In order to generate tumble, therefore, control valve arrangements have been proposed which will redirect the flow through at least certain of the valve seats. Therefore, it should be apparent from the foregoing description that the use of multiple intake passages dictates, with most prior art type of constructions, rather complicated valve arrangements.

It is, therefore, a still further objection of this invention to provide a simplified control valve arrangement for a multi-valve engine.

The use of fuel injection systems for engines has also been resorted to as a way of improving engine performance and, at the same time, obtaining emission control and fuel economy. Fuel injectors offer the possibility of providing better control over the amount of fuel inducted into the engine and also can afford advantages in obtaining stratification relative to carbureted engines.

However, fuel injectors tend to be more expensive and require sophisticated control systems. Therefore, it is desirable, even with multiple valve engines, to employ a lesser number of fuel injectors than the actual number of intake ports or intake valves in the engine. Where multiple ports are utilized and the flow through the ports is controlled so that the flow is not uniform under some running conditions, then fuel distribution can become a problem.

It is, therefore, a still further object of this invention to provide an improved induction and fuel injection system for multiple valve engines.

It is a yet further object of this invention to provide an improved fuel injection system for a multi-valve engine wherein a single fuel injection may be utilized and the desired degree of fuel distribution under all running conditions can be obtained.

Because of the added costs penalties of direct cylinder injection, it has been the practice employ manifold fuel injected systems. These systems, however, are more likely to suffer from distribution problems as aforenoted. It is, therefore, a still further object of this invention to provide an improved single injector manifold injection systems for a multi-valve engine.

As is well known, fuel injectors generally inject the fuel into the airstream at a relatively high velocity. High injection pressures are desirable in order to ensure that the fuel is adequately vaporized or atomized when it enters the flowing airstream. However, the orientation of conventional intake passages requires the positioning of the fuel injector in an orientation so that its spray axis is directed transversely to the flow axis through the intake passage. As a result, there is a likelihood with conventional systems of having the fuel actually deposit on the opposite side of the intake passage from where it is injected. This gives rise to obvious problems.

It is, therefore, a still further object of this invention to provide an improved induction system that permits the fuel to be injected in a direction generally along the flow axis in the intake system.

SUMMARY OF THE INVENTION

A first feature of this invention is adapted to be embodied in a multi-valve internal combustion engine comprised of an engine body that defines at least one combustion chamber. A pair of intake ports open into the combustion chamber for delivering a charge thereto. A pair of intake passages each serve a respective one of the intake ports. A control valve is provided in at least one of the intake passages and is movable between a fully opened, nonflow restricting position and a closed, flow restricting position wherein the flow through the intake passage will be accelerated due to a smaller cross-sectional area. An exhaust port is provided for discharging the combustion products from the combustion chamber. Means are provided for recirculating a portion of the exhaust gases from the exhaust port to the other of the intake passages.

Another feature of the invention is adapted to be embodied in an internal combustion engine induction system for delivering an intake charge to the combustion chamber of the engine. The induction system comprises an intake passage that extends from an atmospheric air inlet to an intake port communicating with the combustion chamber. The intake passage has a first generally straight section that terminates at the intake port and which defines a central flow axis. A second section of the intake passage is offset from the first section and defines a flow axis that is generally parallel to the flow axis of the first section. A curved section joins the downstream end of the second section with the upstream end of the first section. A fuel injector is mounted in the curved section and is disposed so that its spray axis is substantially coincident with the flow axis of the first section of the intake passage.

Another feature of the invention is adapted to be embodied in an internal combustion engine induction system for delivering a charge to a combustion chamber. Three intake ports are provided for delivering a charge to the combustion chamber. These intake ports comprise a pair of side intake ports that are disposed in close proximity to a plane containing the axis of the cylinder bore and a center intake port which is disposed between the side intake ports and further from the plane than the side intake ports. An induction passage provides an atmospheric air charge to the combustion chamber through the intake ports. The induction passage comprises an atmospheric air inlet section which extends from an atmospheric air source toward the combustion chamber. A Siamese side intake passage section has an inlet opening communicating with the downstream side of the inlet section and terminates at the side intake ports. A center intake passage section has an inlet end that communications with the downstream side of the atmospheric air inlet section and which terminates at the center intake port. The center intake passage section extends generally parallel to a plane defined by the Siamese side intake passage section so as to lie in side-by-side relationship with it.

A further feature of the invention is also adapted to be embodied in an internal combustion engine induction system. The induction system in accordance with this feature of the invention is comprised of an intake passage that serves the same combustion chamber through a pair of spaced apart intake ports. A slide-type throttle valve is movable in a portion of the intake passage so as to control the flow through the intake passage and is movable to a position wherein the flow through the intake passage through one of the intake ports can be substantially terminated while the flow to the other intake port is not restricted.

DETAILED DESCRIPTION OF THE PREFERRED EMBODIMENT

Figure 1:
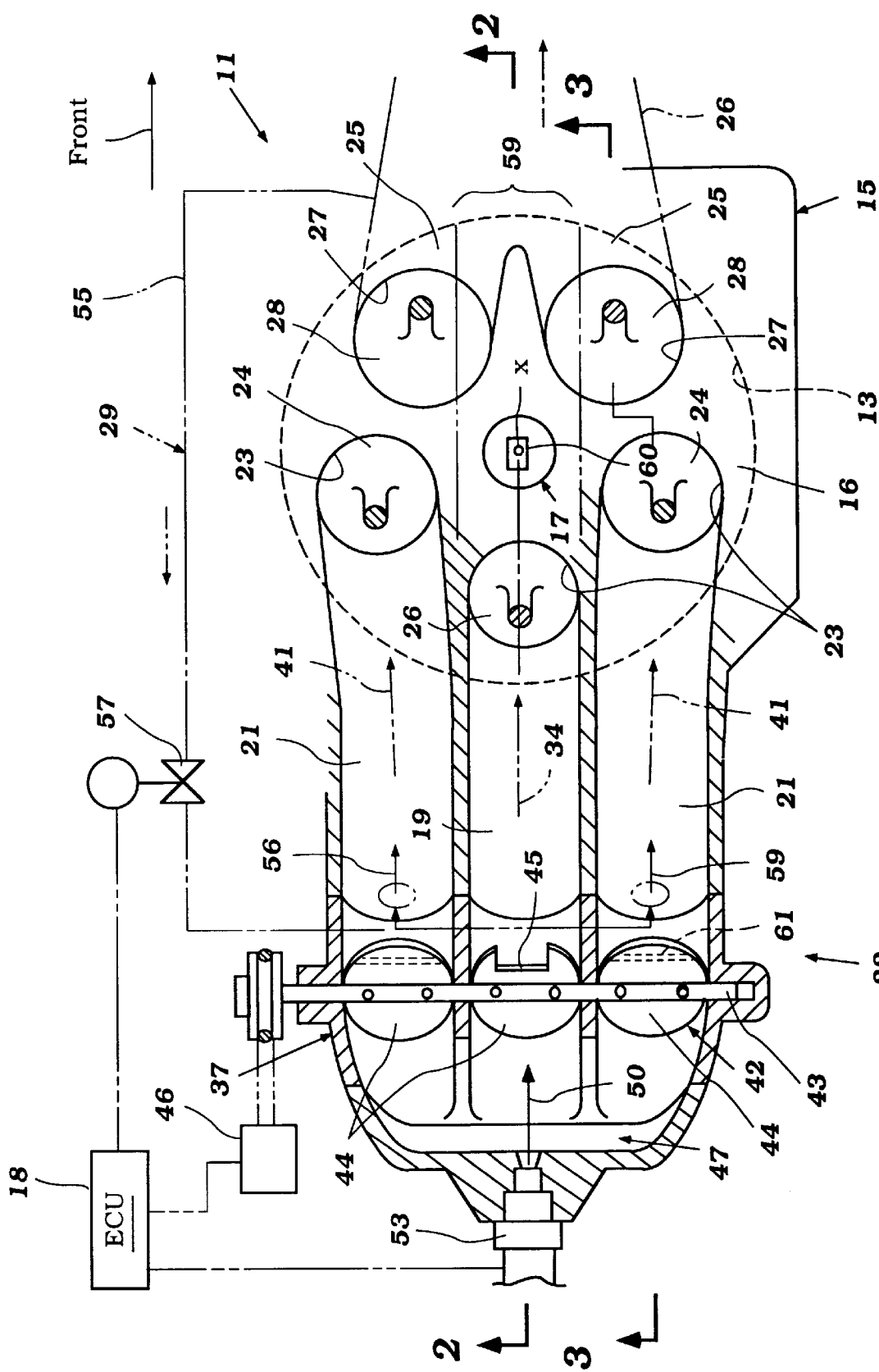
FIG. 1 is a cross-sectional view of a portion of an engine constructed in accordance with an embodiment of the invention with portions of the induction control system for the engine shown schematically.
Figure 2:
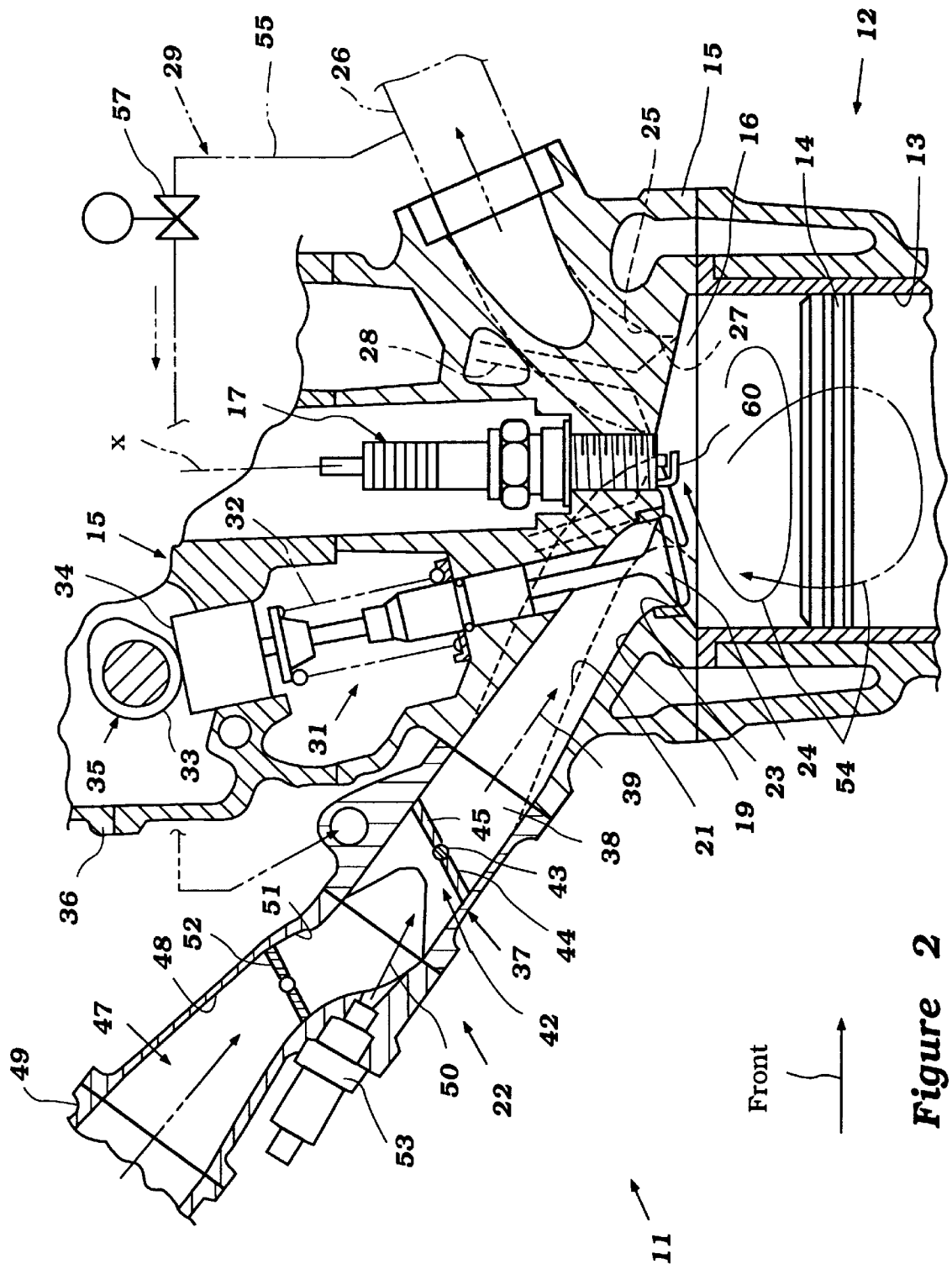
FIG. 2 is a cross-sectional view of the top-most portion of the engine taken along line 2—2 of FIG. 1 and through the center intake passage portion.
Figure 3:
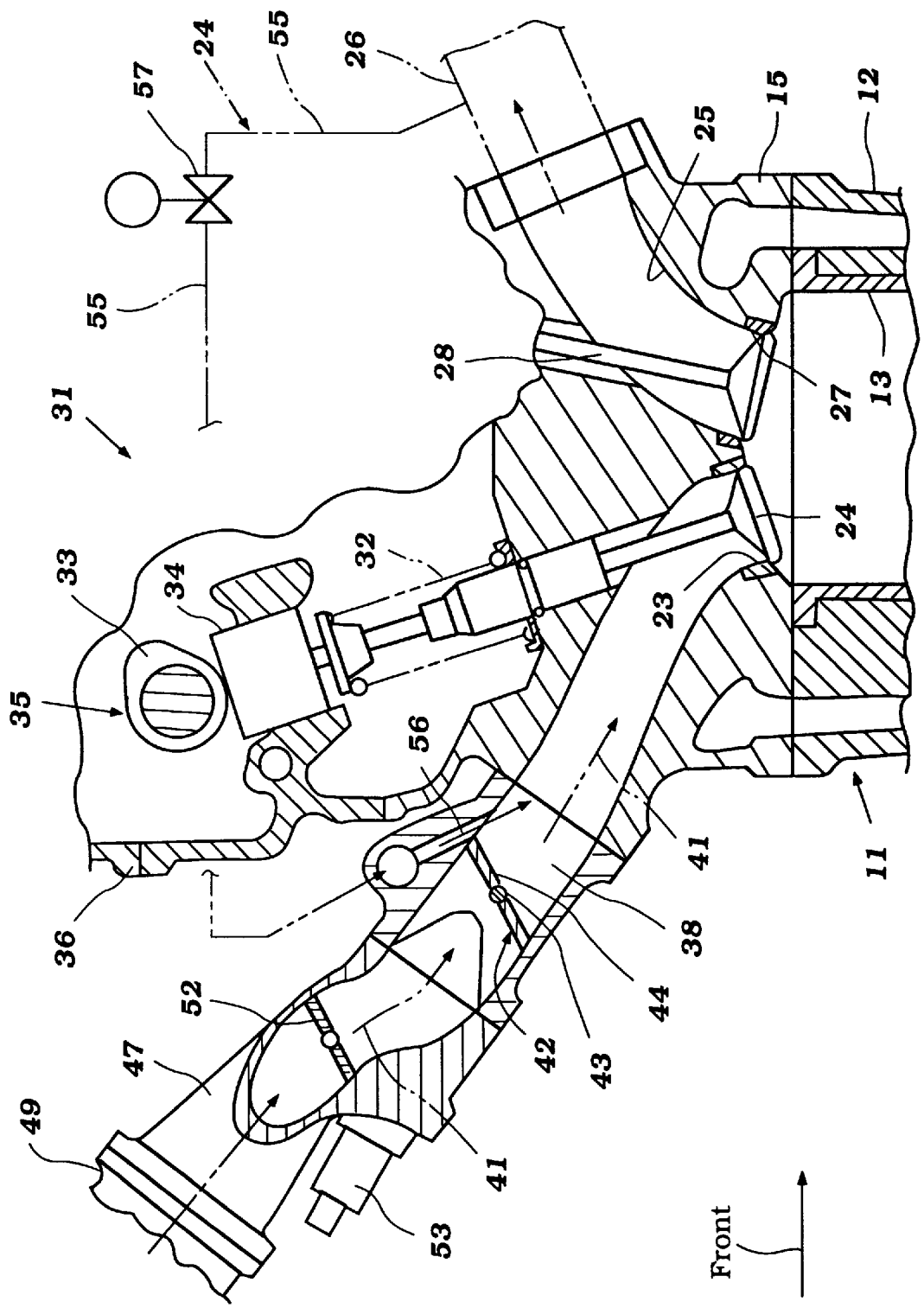
FIG. 3 is a further cross-sectional view of the top-most portion of the engine taken along line 3—3 of FIG. 1 and through one of the side intake passage portions.

Referring now to the drawings and initially to FIGS. 1–3, the uppermost portion of a four-stroke internal combustion engine constructed in accordance with an embodiment of the invention is indicated by the reference numeral 11. The engine 11 may be of any type configuration, such as an in-line type or V-type engine and may have any number of cylinders.

The engine 11 is provided with engine body such as a cylinder block 12 to which is affixed at its lower end by any suitable means a crankcase member (not shown) which contains the crankshaft for the engine 11. A cylinder bore 13 is formed within the cylinder block 12 and in which a piston 14 reciprocates. The piston 14 is pivotally connected to the small end of a connecting rod (not shown) which, in turn, is journaled at its lower end to a throw of the crankshaft (not shown). As already noted the crankshaft is rotatably journaled within the crankcase member.

A cylinder head assembly indicated by the reference numeral 15 is affixed to the upper surface of the cylinder block 12 in any well known manner. The cylinder head 15 has a recess 16 formed in its lower surface above which is positioned a spark plug 17. The spark plug has its gap extending into the recess 16 and is fired by an ignition system (not shown) that is controlled by an electronic control unit (ECU) 18.

The recess 16 is aligned with the cylinder bore 13 and the head of the piston 14 to form a combustion chamber for the engine 11. The recess 16 can be referred to as the combustion chamber since at top dead center (TDC) its volume comprises the major portion of the clearance volume.

A trio of intake passages extend through one side of the cylinder head 15 with the middle intake passage being referred to as the center intake passage and is indicated by the reference numeral 19. The remaining passages are side intake passages and each is indicated by the reference numeral 21. The intake passages 19 and 21 are served by an induction system that is indicated by the reference numeral 22 and will be described in detail later. The intake passages 19 and 21 terminate at their inner ends at a trio of valve seats 23 which are each controlled by respective intake valves 24.

The valve seats 23 are disposed in the combustion chamber 16 so that the center seat 23 is disposed on a plane passing through the axis "x" of the cylinder bore 13. This plane is the same as the plane of FIG. 2. The side valve seats 23 are disposed on opposite sides of this plane and are intersected by a second plane containing the cylinder bore axis x and perpendicular to the first mentioned plane.

In a similar manner, a pair of Siamesed exhaust passages 25 extend through the opposite side of the cylinder head 15 and terminate at a common exhaust passage 26. The exhaust passages 25 originate at respective valve seats 27 which are controlled by a pair of exhaust valves 28. Additionally, an exhaust gas recirculation system that is indicated by the reference numeral 29 and will be discussed in detail later is served by the exhaust passage 26.

The intake and exhaust valves 24 and 28, respectively are operated by a bucket type tappets of a valve train assembly that is indicated by the reference numeral 31 and is shown in FIGS. 2 and 3 for the intake valves 24 only. The valve train assembly 31 is comprised of valve springs 32 which hold the respective valves closed. The valves 24 and 28 are opened upon by cam lobes 33 of respective cam shafts 35 through tappets 34. The overhead cam shafts 35 are journaled for rotation in the cylinder head 15 in a known manner. The cam shafts 35 are driven at one-half engine speed from the crankshaft by any known type of drive. The valve actuating mechanism described is fully enclosed by one or more cam covers 36 that are fixed to the cylinder head 15 in any known manner.

It is commonly known in the art that the utilization of multiple intake valves improves the breathing capacity and thus the performance of an engine. Engines of such configuration do have a problem, however, in that they tend to be inefficient under low-speed, low-load operating conditions. This inefficiency is a result of the low intake charge velocity into the engine's combustion chambers under such operating conditions. An embodiment of this invention eliminates this problem by providing an induction system that ensures that the air entering the combustion chamber is at a velocity sufficiently high so as to maintain high engine efficiency even under low-speed, low-load operating conditions.

The induction system 22 will now be discussed in detail with continued reference to FIGS. 1–3. The induction system 22 is composed of a control valve body 37 in which three side-by-side intake passages 38 are formed and which respectively serve the three cylinder head intake passages 19 and 21. The axis of the center intake passage 38 is in alignment with the axis of the center intake passage 19 which is henceforth referred to as the flow axis and indicated by the reference numeral 39 while the axes for the side intake passages 38 are in general parallel alignment with the flow axes 41 of their respective associated cylinder head intake passage 21. A butterfly type control valve assembly 42 is pivotally journaled within the intake passage assembly 37 and consists of a valve shaft 43 to which are mounted three valves 44 that are each disposed within respective intake passage 38 with an opening 45 formed at the top of the center valve 44 for a reason to be described. The control valve assembly 42 is operated by. an actuator 46 which is controlled by the ECU 18.

An intake manifold assembly, indicated by the reference numeral 47, is affixed to the control valve body 37 in any known manner. The intake manifold assembly consists of a straight, common, upper portion, in which is formed a single passage 48 that is in a parallel offset alignment with the center flow axis 39 and is served by a common atmospheric air inlet 49. This air inlet 49 draws atmospheric air through a suitable inlet having preferably a silencing and filtering device. The single passage 48 then merges into a curved, lower portion which branches into three passages 51 each of which is connected at their downstream ends to a respective one of the intake passages 38. The flow axes are all aligned and that of the center passage 51 is in full alignment with the center flow axis 39.

A single manually-operated throttle valve 52 is pivotally journaled within the second intake passage 47 upstream of the point where the passage 48 branches.

Because of the curvature in the intake manifold 47, it is possible to position and mount a fuel injector, indicated by the reference numeral 53, so that its spray axis 50 is substantially aligned with the flow axis 39. The fuel injector 53 receives fuel from a source in any known manner. The operation of the fuel injector 53 is controlled by the ECU 18.

The induction system 22 functions in the following manner. During an intake stroke for the cylinder 13 the piston 14 moves downwards and produces a negative pressure inside the combustion chamber 16. This draws atmospheric air through the common air inlet 49 and into the intake manifold assembly 47 where it flows past the throttle valve 52 and is mixed with fuel from the fuel injector 53 whose pulse timing and duration is controlled by the ECU 18. The air/fuel charge then enters the control valve assembly 37 and flows past the ECU controlled control valve 42 into the intake ports 19 and 21 and past the open intake valves 24 into the combustion chamber 16, there to be ignited by the spark plug 17 whose firing is controlled by the ECU 18.

When the engine 11 is operating at a low speeds or loads the ECU 18 closes the control valves 44 and thus precludes induction charge flow through the side intake passages 21 while induction charge flow through the center intake passage 19 is still possible since the induction charge flow may readily pass through the center intake passage 38 through the opening 45 formed in the center control valve 44. This reduces the effective area of the induction system 22 which causes the induction charge flow velocity to increase substantially. This, in turn, increases the engine's performance and efficiency for low-speed, low-load operation.

The engine performance under low-speed, low-load operating conditions is further improved by the disposition of the opening 45 on the center control valve 44, which in addition to providing a means by which to increase the intake charge velocity, also tends to redirect the intake charge in such a manner as to produce charge tumbling, the direction of which is indicated by the reference numeral 54, in the combustion chamber 16. This tumbling flow 54 increases the combustion efficiency of the engine 11 by causing more rapid flame propagation under low engine speed, low-load operating conditions and thus further improves the performance and efficiency of the engine 11.

The orientation of the fuel injector 53 further improves the engine efficiency during low-speed, low-load engine operation. Since the fuel injector spray axis is aligned substantially with the flow axis 39 for the center intake port 19 the fuel will tend to flow into the center intake port 19 instead of the side intake ports which are fully restricted by the control valves 44. Thus, the ideal air/fuel mixture ratio as determined by the ECU 18 is maintained in the intake charge entering the combustion chamber 16 which optimizes the combustion efficiency.

This also produces stratification of the stoichiometric charge in the area indicated at 59 in FIG. 1. This area 59 includes and surrounds the gap 60 of the spark plug 17. This gap is also on the cylinder bore axis x. Thus a not only will there be a stoichiometric charge at the spark gap 60 at the time of firing, but the flame travel distances to all parts of the combustion chamber. Thus full combustion is insured. The tumble motion indicated by the arrows 54, which intensifies as the piston 14 approaches top dead center, will assist in both the stratification and flame propagation.

It is also a common practice in the art to reduce the exhaust gas emissions, especially the nitrous oxide emissions, of an engine during by incorporating an exhaust gas recirculation (EGR) system within the induction system which directs exhaust gases from the exhaust system back to the induction system where they are once again entered into the combustion chamber. Obviously, there is an upper limit to the amount of exhaust gas which can be recirculated without adversely effecting the combustion of the intake charge also present in the combustion chamber. These conditions usually prohibit the use of EGR at low speeds and low loads.

The stratification and rapid flame propagation of this system, however, permits the use of EGR even at low speeds and low loads. In addition the EGR can be utilized to further increase the stratification effect. Thus a feature of this invention utilizes an EGR system which permits the addition of large amounts of exhaust gases into the combustion chamber without adversely affecting combustion.

The EGR system 29 will now be described in detail. The EGR system 29 consists of a conduit 55 that is served by the exhaust passage 26 and terminates at a pair of inlets 56 that are formed in the control valve assembly 37. The inlets open to the side intake passages 38 downstream of the control valve assembly 42. An EGR valve 57 is positioned in the conduit 55 and is controlled by the ECU 18 and used to regulate the amount of exhaust gases entering the induction system 22 through the inlets 56 in response to engine running conditions.

The EGR system 29 functions in the following manner. During an exhaust stroke of the engine 11 the exhaust gases exit the combustion chamber 16 past the open exhaust valves 28 and through the exhaust passages 25. From the exhaust passages 25 the exhaust gases enter the exhaust passage 26 and a portion of the exhaust gases enters the EGR conduit 55 past the ECU controlled regulator valve 57 and enters the induction system 22 through the inlets 56. From the side intake passages 38 the exhaust gases are drawn into the combustion chamber 16 through the intake passages 21 during the intake stroke for the engine 11.

When the engine 11 is operating under low-speed, low-load conditions the control valves 44 are closed and no charge is flowing through the side intake passages 38. Thus, large amounts of exhaust gases are drawn into the side intake passages 38 due to the large vacuum pressure present and into the combustion chamber 16 through the side intake passages 21, separate from the charge entering through the center intake passage 19. Thus, a large amount of exhaust gas is recirculated back into the combustion chamber 16 in the area bounding the area 59 where a stoichiometric charge is present. Thus it is possible to maintains the high engine performance and efficiency levels even with quite large amounts of EGR, particularly at low speeds and loads. Thus $_{NOx}$ control is possible even under this running condition without causing misfires and/or rough running.

In order to control the amount of EGR at idle and low speeds and loads as also shown in FIG. 1 the top portion of the side intake passage control valves 44 may be relieved as shown by the line 58. Thus, induction charge flow is permitted through the side intake passages 38 even when the control valves 44 are fully closed. This also results in less exhaust gas being drawn into the side intake passages 38 since the pressure gradient in the passages 38 is less and thus less exhaust gas is drawn through the side intake passages 38.

Figure 4:
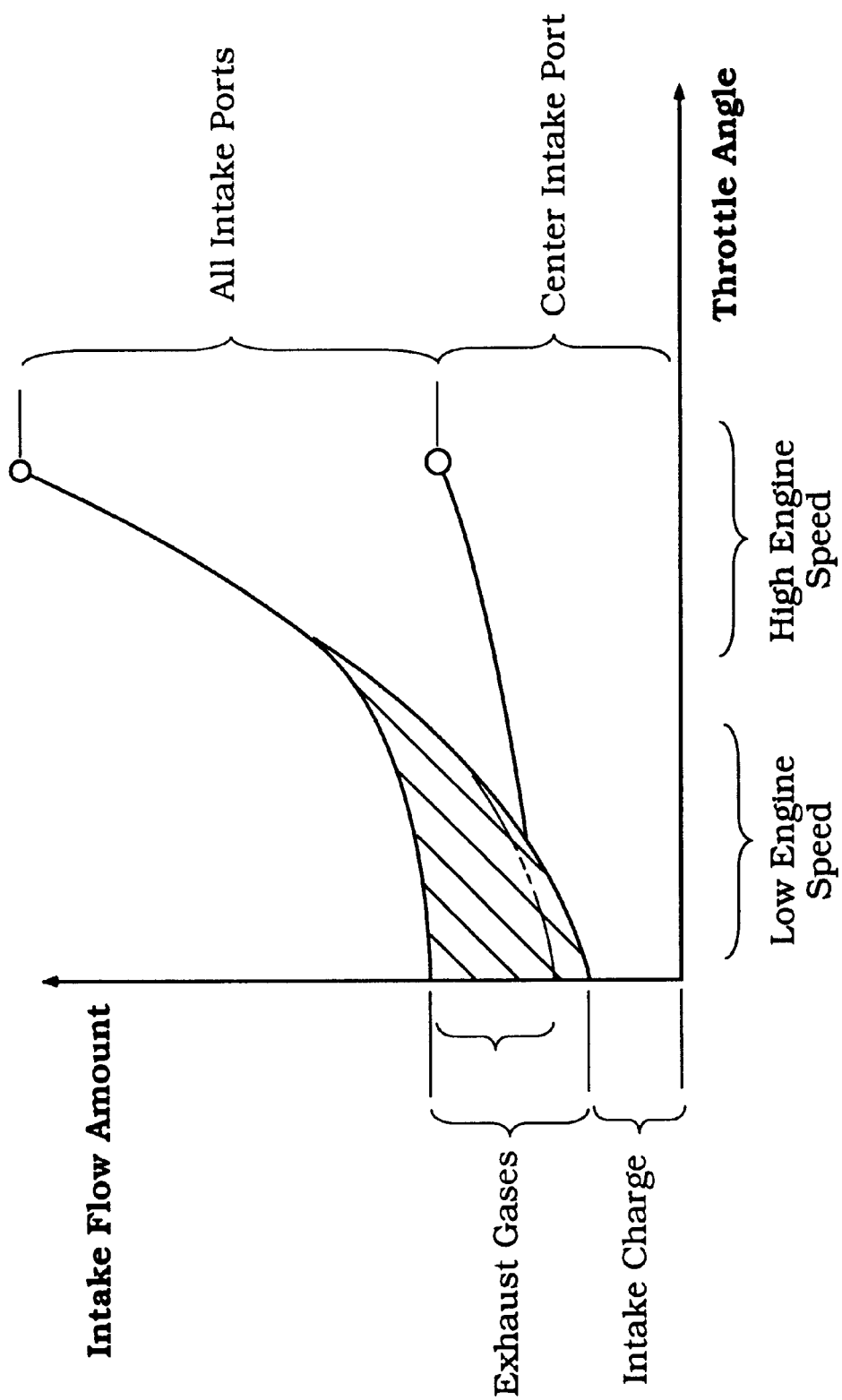
FIG. 4 is a graphical view that shows the relationship between induction charge and exhaust gas flow into the combustion chamber in respect to the throttle angle.

FIG. 4 is a graphical view which illustrates the flow of intake charge and exhaust gases into the combustion chamber 16 for a given throttle angle for these embodiments. The upper solid line indicates the total flow amount into the combustion chamber 16 while the lower solid line indicates the portion of the total flow amount that enters the combustion chamber 16 through the center intake passage 38. The shaded portion of the curve represents the amount of the exhaust gas that is recirculated into the combustion chamber 16 with the shaded portion below the dashed line indicative of the exhaust gas content for the where intake charge flow is permitted through side intake passages 38. As is seen, a large amount of exhaust gases is recirculated when the engine 11 is operating at a lower speed which amount decreases with increasing engine speed and is eventually discontinued by the closing of the EGR valve 57.

Figure 5:
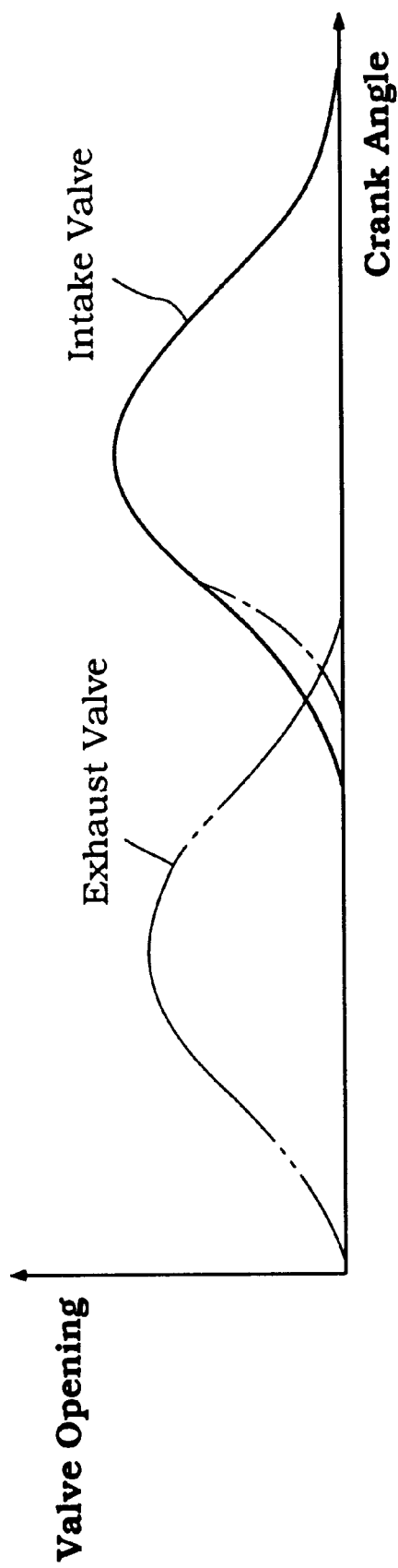
FIG. 5 is a graphical view that shows the relationship between the intake and exhaust valve opening condition and the crankshaft angle.

FIG. 5 is a further graphical view which illustrates the intake and exhaust valve opening condition for a given crankshaft angle with the first dashed line indicative of the exhaust valve opening condition and the solid line indicative of the intake valve opening condition. Unlike conventional engines it is possible because of the utilization of the above-described induction system to have a greater degree of valve overlap than would otherwise be possible. The broken line view shows a conventional engine valve timing. This is possible because of the stratification effect and allows for the use of more radical valve timing to improves the high speed performance of the engine 11 without sacrificing low speed performance.

Figure 6:
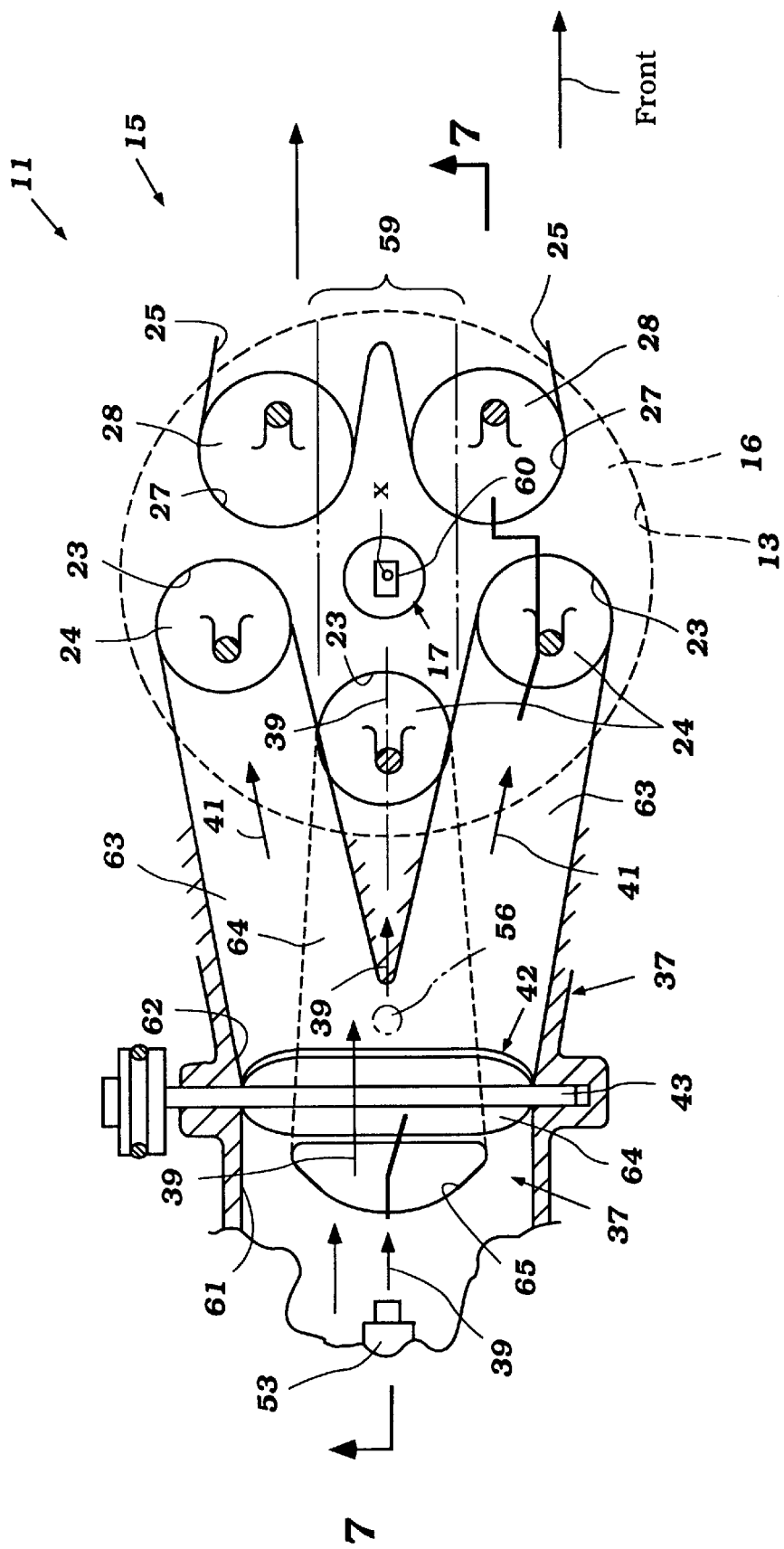
FIG. 6 is a partial cross-sectional view similar to FIG. 1 and shows another embodiment of the invention.
Figure 7:
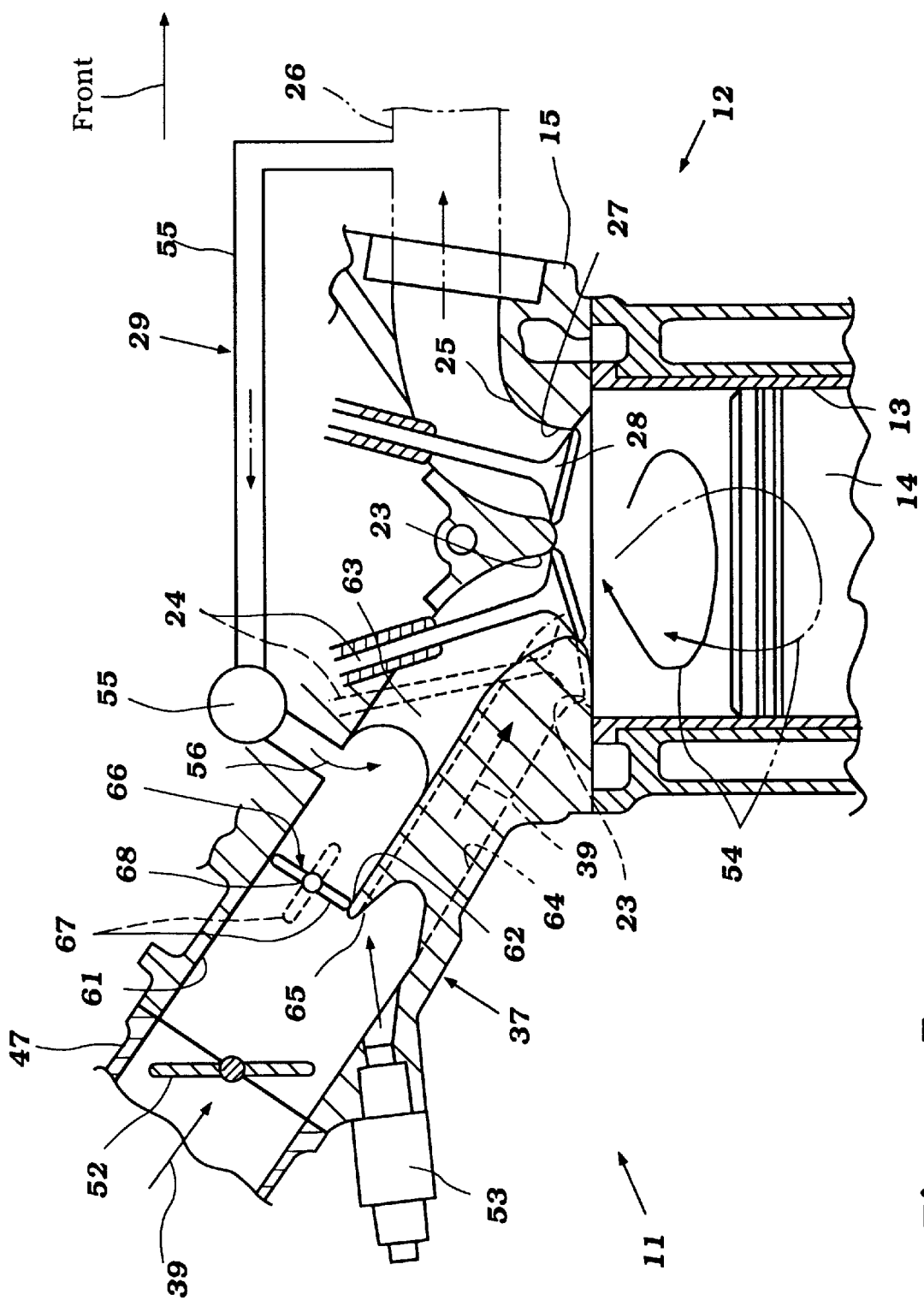
FIG. 7 is a cross-sectional view taken along line 7—7 of FIG. 6.

FIGS. 6 and 7 illustrate a further embodiment of the invention. In this embodiment the separate control valve assembly 37 is eliminated. The individual cylinder head intake passages, one for each intake valve seat 23 are replaced. A single intake passage 61 opens through one side of the cylinder head and branches down stream of an oval shaped portion into a pair of side passage portions 63 each of which serves one of the side valve seats 23.

A center intake passage 64 of the cylinder head 15 has an inlet opening 65 formed in a lower wall of the inlet portion 61. The center intake passage 64 is disposed below and between the side intake passages 63. The center passage 64 extends generally parallel to a plane containing the centers of the passages 63. The opening 65 is slightly upstream of the oval portion 62.

Flow through the oval-shaped opening 62 that is controlled a control valve assembly 66, which is composed of a single, butterfly type control valve 67. The control valve 67 is journalled directly in the cylinder head 15 on a control valve shaft 68. The shaft is operated and controlled in a manner as in the embodiment of FIGS. 1–5.

The fuel injector 53 of this embodiment is mounted directly in the cylinder head 15 in close proximity to the lower center intake passage 64 and specifically adjacent its opening 65. The injector 53 is oriented with its spray axis perpendicular to the axis of the cylinder bore 13.

This embodiment permits the use of a single inlet 56 for the EGR system 29 located along the upper edge of the termination of the oval-shaped opening 62. Thus the exhaust gasses will readily divide for flow into the side intake passages 63.

The single throttle valve 52 is disposed at the inlet to the cylinder head inlet passage opening 61.

With the above configuration during low engine speed operation the intake charge flow into the side intake passages 63 is precluded by the single control valve 67 which is oriented in the closed position by the ECU 18 while intake charge flow into the combustion chamber 16 through the center intake passage 64 is in no way impeded. Also, the fuel injector 53 tends to inject the fuel directly into the center intake passage 64 under low-speed, low-load engine running conditions. Thus, the above induction system configuration once again ensures the efficient operation of the engine 11 at low-speed, low-load operating conditions while continuing to provide for increased exhaust gas emissions reduction.

Figure 8:
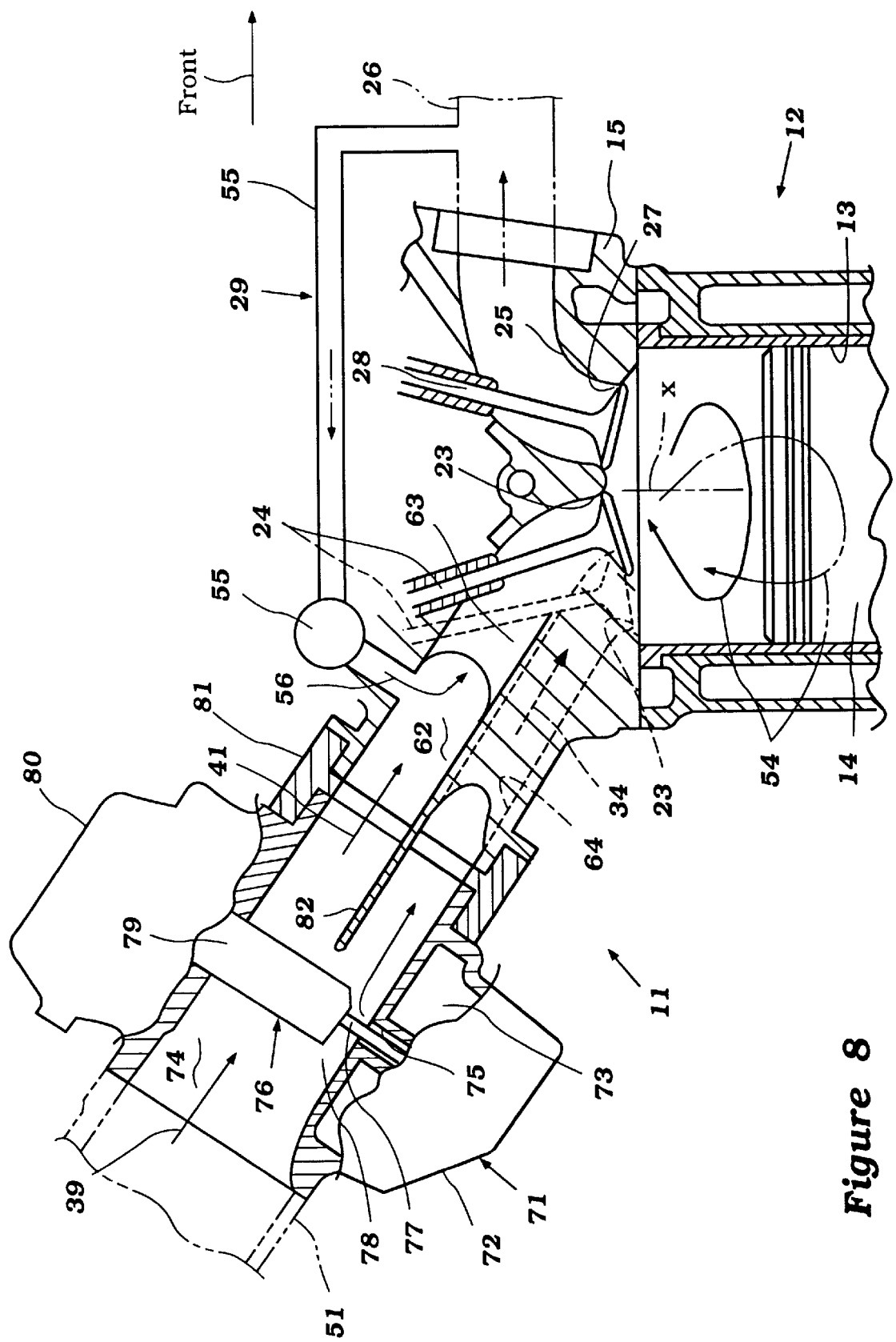
FIG. 8 is a cross-sectional view similar to FIG. 7 and shows a further embodiment of the invention.

FIG. 8 illustrates a further embodiment of the invention in which the fuel injection and separate throttle valve utilized in the embodiment of FIGS. 6 and 7 has been eliminated in favor of a carburetor that is indicated by the reference numeral 71. Since a carburetor 71 replaces the cylinder head mounted fuel injector 53, the cylinder head 15 may be shortened in the area of the intake passage inlet portion 61. In fact, in this embodiment, the passage 61 is entirely eliminated from the cylinder head 15.

The carburetor 71 consists of an outer housing 72 in which is formed a float chamber 73. Fuel is contained in the float chamber 73 at a level that is controlled by a float (not shown) which regulates the influx of fuel from a fuel tank (not shown) to the float chamber 73.

A main metering jet 75 discharges from the float chamber 73 into a common intake passage 74 formed by the carburetor body 72. This common intake passage 74 serves both of the cylinder head intake passages 62 and 64.

The carburetor 71 is of the sliding piston throttle valve type. Therefore it includes a piston-type throttle valve 76 which is actuated in a known manner. The piston 76 carries a metering rod 77 that extends through the main jet 75 to control its effective flow area depending on the position of the sliding piston. The piston also determines the effective flow area 78 of the induction passage 74 where it connects at its upper end to a restricted flow portion 78 of the throttle valve 77.

The throttle valve 77 has a shank portion 79 that is, in turn, slidingly journaled within an upper housing portion 79 of the carburetor 71. This portion 79 is connected appropriately to a throttle actuator (not shown).

A seal 81 joins the carburetor 71 to the cylinder head 15. The intake passages 64 and 62 merge into the carburetor intake passage 74. In addition a dividing wall 82 of the cylinder head 15 extends into the carburetor intake passage 74 and terminates immediately behind the throttle valve 76. Thus the throttle valve 76 also functions as and thus replaces the control valves of the earlier embodiments.

The above induction system functions in the following manner. With the throttle valve 76 in its fully open position an unrestricted flow portion 76 permits the flow of intake charge into both the center 64 and side 63 intake passages. However, for low-speed, low-load engine operation, the throttle valve 76 blocks the charge from flowing into the side intake passage opening 62 and operates like the control valves of the previous embodiments.

From the foregoing description, it should be readily apparent that the described embodiments of induction systems are very effective in maintaining good engine performance under all running and load conditions and also ensuring a reduction in the amount of nitrous oxides in the exhaust. In addition, the described arrangements provide a very compact induction system that can be easily fitted into modern motor vehicles and also which generally improves in some instances the fuel distribution and in some instances simplifies the control valve arrangements. Of course, those skilled in the art will readily understand that the foregoing description is that of preferred embodiments of the invention, and that various changes and modifications may be made without departing from the spirit and scope of the invention, as defined by the appended claims.

What is claimed is:

1. An internal combustion engine induction system for delivering a charge to a combustion chamber, three intake ports for delivering a charge to said combustion chamber comprised of a pair of side intake ports and a center intake valve port disposed between said side intake ports, an induction passage for serving said intake ports comprising an atmospheric air inlet section extending from an atmospheric air source towards said combustion chamber, a Siamesed side intake passage having a common inlet opening communicating with the downstream end of said inlet section and a pair of branch portions extending from said common inlet opening, each of said branch portions terminating at a respective one said side intake ports, and a center intake passage section having an inlet end communicating with the downstream end of said air inlet section and terminating at said center intake port, the entire length of said center intake passage section from said inlet end extending generally parallel to a plane defined by said branch portions of said Siamesed side intake passage.

2. An internal combustion engine induction system as set forth in claim 1, further including a control valve for controlling the flow through only certain of the intake passages.

3. An internal combustion engine induction system as set forth in claim 2, wherein the control valve controls the flow only through the Siamesed side intake passage.

4. An internal combustion engine induction system as set forth in claim 3, wherein the control valve is positioned downstream of the point where the center intake passage communicates with the atmospheric air inlet section.

5. An internal combustion engine induction system as set forth in claim 4, further including a fuel injector for injecting fuel into the atmospheric air inlet section.

6. An internal combustion engine induction system as set forth in claim 5, wherein the fuel injector injects fuel into the atmospheric air inlet section upstream of the point where the center intake passage communicates with the atmospheric air inlet section.

7. An internal combustion engine induction system comprised of an intake passage serving the same combustion chamber through a pair of spaced apart intake ports, a slide-type throttle valve slidably supported in said intake passage, said slide-type throttle valve being comprised of a piston-type throttle valve that is disposed in a common portion of a Siamesed-type intake passage and immediately adjacent the upstream end where the branches of said Siamesed-type intake passage merge and movable between an open position wherein the flow through both of said intake ports is substantially unrestricted and at least a partially open position wherein the flow through one of said intake ports is substantially completely precluded.

8. An internal combustion engine induction system comprised of an intake passage serving the same combustion chamber through a pair of spaced apart intake ports, a slide-type throttle valve slidably supported in said intake passage and movable between (1) an open position wherein the flow through both of the intake ports is substantially unrestricted (2) at least a partially open position wherein the flow through one of the intake ports is substantially completely precluded and (3) to a position wherein the flow through the one intake port is partially restricted and the flow therethrough is redirected into the combustion chamber.

9. An internal combustion engine induction system comprised of an intake passage serving the same combustion chamber through three intake ports opening into the combustion chamber and each served by a respective intake passage, the intake ports comprising a center intake port disposed between the remaining side intake ports, said center intake port lying at least in part on a first plane containing the axis of the cylinder bore and being spaced from a second plane also containing the axis of the cylinder bore and perpendicular to the first plane and which second plane intersects the pair of side intake ports, and a slide-type throttle valve slidably supported in said intake passage and movable between an open position wherein the flow through all of said intake ports is substantially unrestricted at least a partially open position wherein the flow through at least said of the intake ports is substantially completely precluded.

* * * * *